Sept. 24, 1946.  W. H. WIRKLER  2,408,118
AZIMUTH RADIO DIRECTION FINDING SYSTEM
Filed Feb. 14, 1939   2 Sheets-Sheet 1
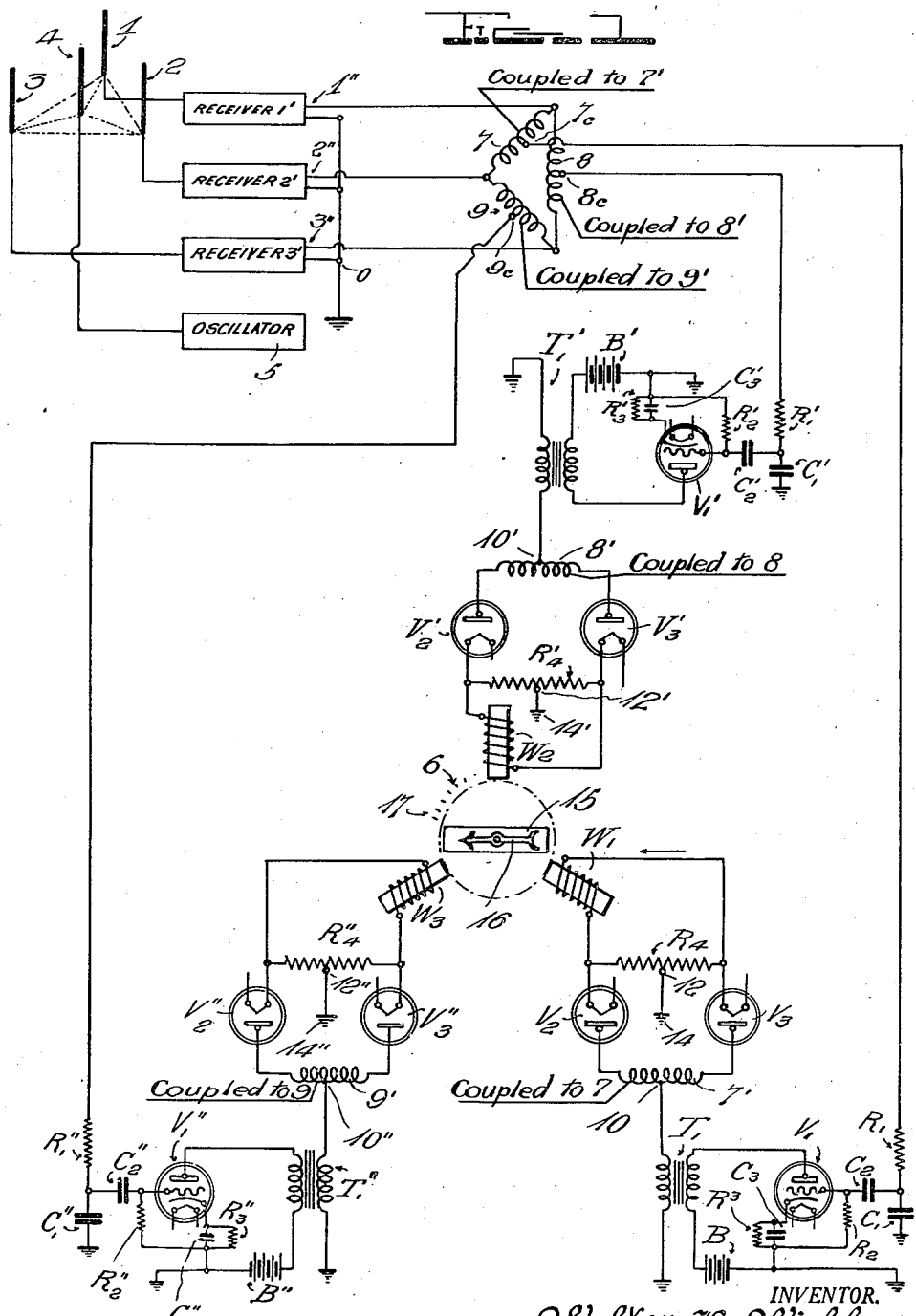
INVENTOR.
Walter H. Wirkler,
BY
John B. Brady
ATTORNEY.

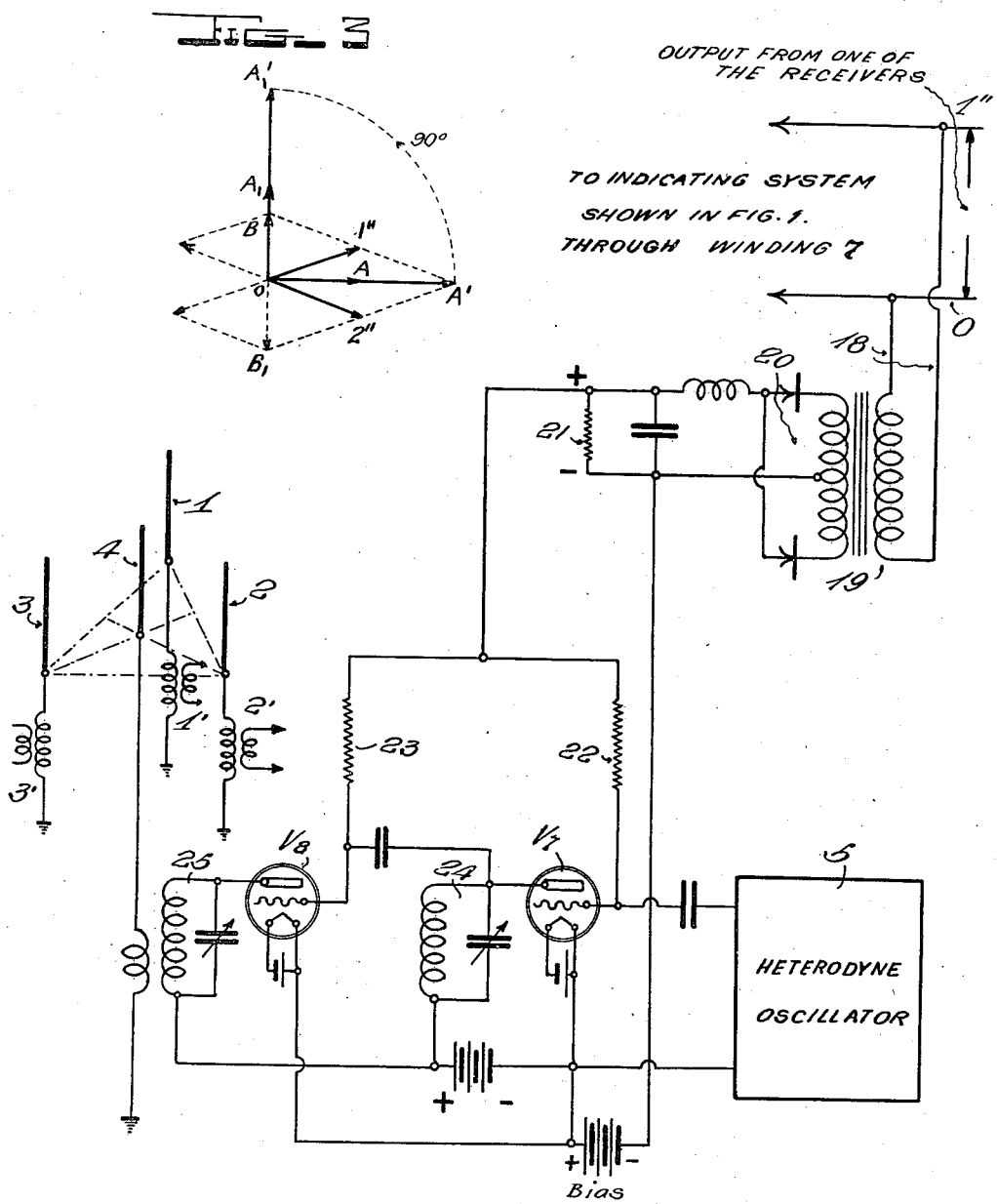

Patented Sept. 24, 1946

2,408,118

UNITED STATES PATENT OFFICE 2,408,118

AZIMUTH RADIO DIRECTION FINDING SYSTEM

Walter H. Wirkler, Cedar Rapids, Iowa, assignor to Collins Radio Company, Cedar Rapids, Iowa, a corporation of Iowa Application February 14, 1939, Serial No. 256,339

16 Claims. (Cl. 250—11)

My invention relates broadly to direction finding systems and more particularly to a circuit arrangement for an azimuth direction finding system whereby the direction of arrival of a radio signal may be visually observed on a suitably calibrated scale.

One of the objects of my invention is to provide a circuit arrangement for accurately indicating the direction of arrival of a radio signal from a mobile body carrying a radio transmitter at a fixed position whereby the direction of the mobile body may be readily determined from the fixed position.

Another object of my invention is to provide a circuit arrangement for a radio receiving system having means for providing an instant indication of the direction of arrival of a radio signal.

Still another object of my invention is to provide a circuit arrangement for a signal receiving system in which separate receiving antennas are located in spaced relation in positions constituting the apices of an equilateral triangle with separate receiving circuits connected with the antennas and with the indicating apparatus, and in which an injector antenna and associated oscillator are arranged at the center of the equilateral triangle for electromagnetic coaction through space with the antennas leading to the receiving circuits and to the indicating system.

A further object of my invention is to provide an indicating system for determining the direction of arrival of a radio signal in which independent antennas are located in geographically spaced positions constituting the apices of an equilateral triangle and connected through separate receiving circuits with an indicating system and adapted to electromagnetically coact with an injector antenna centrally positioned within the equilateral triangle and excited from a regulated source of radio frequency energy which is controllable automatically from one of the receiving circuits electrically connected with the indicating system.

A still further object of my invention is to provide a circuit arrangement for integrating in a calibrated indicating system the effects of a remote signal source upon a multiplicity of prearranged antenna systems for accurately indicating the direction of movement of a signal source toward the antenna systems.

Other and further objects of my invention reside in the circuit arrangement for a direction finder system as set forth more fully in the specification hereinafter following by reference to the accompanying drawings, in which:

Figure 1 diagrammatically shows the direction finder system of my invention and schematically illustrates the indicator system which directly indicates the direction of approach of a radio signal source; Fig. 2 is a diagrammatic view illustrating the manner of exciting the injector antenna of the multiple antenna system employed in the system of my invention and illustrating the manner of controlling the amount of high frequency energy supplied to the injector antenna under control of one of the signal receiving circuits connected to one of the coacting receiving antennas; and Fig. 3 is a vector diagram explaining the manner of operation of the system of my invention.

Direction finder systems have heretofore been known in which the circuit balance is obtained wholly in the antenna circuit. This applies to the many variations of the so-called Adcock system and equally to the systems using direction finding loops. In the system of my invention, electrical balance of the antenna circuits is not essential and is not obtained by means within the antenna circuit per se.

I provide an arrangement of antennas in geographically spaced positions at the apices of an equilateral triangle connected through separate receiving circuits to a polyphase transformer system from each phase of which energy is applied to the actuating magnet of an electromagnetically operated integrating calibrated instrument. The calibrated instrument is arranged to directly indicate the direction of arrival of a radio signal source with respect to the geographically spaced antennas. An injector antenna is located centrally of the equilateral triangle formed by the several receiving antennas and is supplied by a radio frequency source, the amplitude of which is controlled by a portion of the energy received by one of the receiving circuits associated with the several antennas. The injector antenna electromagnetically coacts with the receiving antennas through space in delivering a radio frequency current to the several receiving circuits. The operation of the indicator is very accurate and permits the use of the system at ground stations for directly observing the direction of aircraft from the station, or the direction finder system of my invention may be used on mobile bodies such as ships or aircraft for directly indicating the direction of a radio transmitter for facilitating the navigation of the mobile body toward the emitting source.

The circuit arrangement of the receiving system is given diagrammatically in Fig. 1. Three conventional receivers are individually connected through transmission lines to three separate antennas represented at 1, 2 and 3. The antennas themselves are arranged at the vertices of a triangle where the distance between the antennas is not greater than ½λ of the received wave. A fourth antenna or "injector antenna" indicated at 4, is located at the center of the equilateral triangle outlined by the three antennas 1, 2 and 3 referred to hereinbefore. The fourth antenna 4 is connected to the output of a heterodyne oscillator 5, the purpose of which is to produce a low frequency audio beat note in the output of each of the three receivers 1', 2', and 3'. The phase relation between the three audio frequencies produced at the receiver terminals and the phase relation of the three received signal voltages in the antennas may be shown to be identical. From the phase relation of the three low frequency voltages, it may further be shown that the direction of signal arrival can be determined.

The indicator is of the "Selsyn" type and is principally actuated by the difference between the voltages in receivers 1' and 2', 2' and 3', and 3' and 1', in paired combinations. It may be observed at this point that insofar as the operation of the three receivers is concerned, it is strictly and entirely conventional. They may be of a type employing automatic volume control, and their audio gain controls so adjusted to produce equal magnitude output voltages. My invention is directed to the utilization of the three audio voltages to operate a directional indicating system shown generally at 6 and resides in an arrangement of injector antenna to produce a low frequency beat note in the output of each of the three receivers where the phase relations of the three low frequency voltages are identical to the phase relations of the three high frequency voltages induced in the separate antennas by the distant transmitter. $1''-0$, $2''-0$ and $3''-0$ are the terminals of the radio receivers arranged Y connection. Reference characters 7, 8 and 9 designate transformer primaries arranged in delta. The first receiver voltage is designated $E_{1''-0}$, the voltage of the second receiver $E_{2''-0}$ and the third receiver voltage $E_{3''-0}$. These three voltages are low frequency voltages of the same magnitude and frequency but different phase. The magnitude of the voltages may either be adjusted manually or automatically, preferably the latter. The voltage impressed across the primary terminals of the transformer primary 7 is the difference between the voltages $E_{1''-0}$ and $E_{2''-0}$. This voltage will be designated $$E_{1''-2''} = E_{1''-0} - E_{2''-0}$$

Similarly, the voltage across the primary winding 8 is $E_{1''-3''} = E_{1''-0} - E_{3''-0}$; and the voltage across the primary winding 9 is $$E_{2''-3''} = E_{2''-0} - E_{3''-0}$$

These voltage differences are impressed across the primaries 7, 8 and 9 simultaneously.

Terminal 7c is a center tap on transformer primary 7 and the voltage between 7c and ground will be the average of the voltages $E_{1''-0}$ and $E_{2''-0}$. Similar center taps on the windings 8 and 9 shown at 8c and 9c which give the averages of the voltages $E_{2''-0}$ and $E_{3''-0}$; and $E_{3''-0}$ and $E_{1''-0}$. The center tap 7c on winding 7 is connected to the grid of a vacuum tube $V_1$ through a resistance $R_1$. Placed effectively in parallel with the grid is a condenser $C_1$ which has a small reactance in comparison with the value of the resistance $R_1$. Condenser $C_2$ and resistance $R_2$ as well as $C_3$ and $R_2$ comprise conventional means of obtaining bias voltage for tube $V_1$ while source B represents the conventional means for securing plate potential for tube $V_1$.

Referring to the vector diagram, Fig. 3, the vector $0-1''$ represents the voltage $E_{1''-0}$ from receiver 1', and vector $0-2''$ the voltage $E_{2''-0}$ from receiver 2'. The voltage between ground and tap 7c on the primary winding 7 connected to receivers 1' and 2' is the average or half the vector sum of the two voltages from receivers 1' and 2', and is represented in Fig. 3 by vector $0A$ which is one-half the vector sum $0A'$ of the voltages represented by vectors $0-1''$ and $0-2''$. The voltage across the terminals of primary winding 7 is the vector difference of the voltages $E_{1''-0}$ and $E_{2''-0}$ from the receivers 1' and 2', respectively, and is represented by vector $0B$ in Fig. 3, wherefrom it is seen that the average voltage $0A$ and the difference voltage $0B$ are in phase quadrature.

Windings 7', 8' and 9', Fig. 1, are the secondary windings respectively of primaries 7, 8 and 9 and are coupled therewith. The voltage across primary winding 7, for example, is applied through secondary 7' in push-pull relation to diodes $V_2$ and $V_3$, and the other primary voltages are similarly applied in the respective circuits. Diodes $V_2$ and $V_3$ serve as independent rectifiers feeding the output resistor $R_4$, the center tap 12 of which is grounded at 14. A coupling transformer $T_1$ is connected in the anode circuit of tube $V_1$ with its secondary connected between ground and the center tap 10 on secondary winding 7'. Rectifiers $V_2$ and $V_3$ are thus energized by the difference voltage, represented by vector $0B$ in Fig. 3, in push-pull relation, and by the average voltage, represented by vector $0A$ in Fig. 3, in balanced relation, being applied between taps 10 and 12. The resulting voltage across output resistor $R_4$, due to interaction of the difference and average voltages, is applied to winding $W_1$ of the indicator device 6.

Referring again to Fig. 3, it was noted above that the difference voltage, vector $0B$, and the average voltage, vector $0A$, are in phase quadrature at the terminals and center tap of primary winding 7. In order that these voltages may coact properly in the circuits of rectifiers $V_2$ and $V_3$, however, they must be substantially in phase. The purpose of the resistor $R_1$, condenser $C_1$ and tube $V_1$, connected between the center taps 7c and 10 on the primary 7 and secondary 7', respectively, is to apply a phase shift of essentially 90° to the average voltage, represented in Fig. 3 by vector $0A$, to bring the average voltage into phase with the difference voltage. In Fig. 3, the phase shift is indicated by the rotation of vectors $0A$ and $0A'$ to the positions $0A_1$ and $0A_1'$ in coincidence with the difference voltage vector $0B$. Voltages represented by vectors $0B$ and $0A_1$ are, therefore, the voltages effective in the rectifiers $V_2$ and $V_3$.

From Fig. 3, it will also be seen that if the relative phase of vectors $0-1''$ and $0-2''$ is reversed, the difference voltage vector $0B$ will be reversed to position $0B_1$ while the average voltage vector $0A_1$ will remain as before. The result in the output resistor $R_4$ is a reversal in polarity of the direct voltage produced by the coaction of the difference and the average voltages in the rectifiers, which eliminates 180° ambiguity in the indication. The knowledge that one of the resultant vectors does not change phase with reversal of the relative phase of the component vectors provides the factor by which the relative phase is determined to avoid the 180° ambiguity.

It will be understood that either the difference voltage or the average voltage may be subjected to the phase shift to make the voltages in phase preparatory to coaction in the rectifiers $V_2$ and $V_3$. And, likewise, it will be understood that the difference voltage may be applied in balanced relation to the diodes $V_2$ and $V_3$, and the average voltage in push-pull relation, if desired, instead of in the relation shown and described.

In the event the voltages represented at $0-1''$ and $0-2''$, Fig. 3, are in phase and equal in magnitude, the difference voltage represented by vector $0B$ will be zero. In Fig. 1, then, no voltage will exist across transformer primary 7 but an average voltage $0A$, Fig. 3, will exist between tap 7c and ground. This voltage will be shifted in phase, amplified by tube $V_1$ and operate rectifiers or diodes $V_2$ and $V_3$ identically. Equal and opposite currents will therefore flow in the two halves of resistor $R_4$ and hence no voltage will exist across the terminals of $R_4$. The currents produced in $R_4$, however, have a fixed directional factor which is maintained regardless of the relative phase relations of the components $E_{1''-0}$ and $E_{2''-0}$, and thus these currents provide a reference sense in the control of the indicator 6 through winding $W_1$. If the voltages $E_{1''-0}$ and $E_{2''-0}$ are slightly displaced in phase with respect to each other, as represented in Fig. 3, a voltage will exist across transformer secondary 7' which will increase the voltage delivered through center tap 10 on one diode and decrease it on the other. Under these conditions the current in the two halves of $R_4$ will be unequal and the difference current which will flow through the winding $W_1$ of the indicating instrument 6 will be proportional to the magnitude of the difference of the voltages $E_{1''-0}$ and $E_{2''-0}$. It should be observed at this point that if the above discussion applies when $E_{1''-0}$ leads $E_{2''-0}$ in phase value, a current will flow in the winding $W_1$ in a direction, for example, indicated by the arrow. If the phase relations of $E_{1''-0}$ and $E_{2''-0}$ are reversed so that the voltage $E_{2''-0}$ leads $E_{1''-0}$ the current in the winding $W_1$ of the indicating instrument 6 will be reversed.

An exactly similar circuit arrangement, which I have indicated by similar reference characters with primed designations, is used to supply the winding $W_2$ of the indicating instrument 6 in accordance with the voltage difference $E_{1''-0}$ and $E_{3''-0}$. A third circuit arrangement represented by elements of identical nature designated by double primed characters supplies a winding $W_3$ of the indicating instrument 6 in accordance with the voltage difference $E_{3''-0}$ and $E_{2''-0}$. In each instance the secondary windings for the delta connected primary windings have been shown diagrammatically spaced from the coacting primary windings, but it will be understood that the windings are inductively coupled in each instance, that is to say, winding 7' couples with winding 7; winding 8' couples with winding 8; and winding 9' couples with winding 9, as indicated in Fig. 1.

The system of my invention develops three independent currents. The magnitude of each current is proportional to the vector difference between the audio voltages from two of the three receivers. The direction of the current flowing in any winding $W_1$, $W_2$ or $W_3$ of the indicator 6 is determined by which of the two voltages involved in the subtraction is the leading voltage. These currents act on the magnetic member 15 for controlling the position of indicator 16 with respect to a calibrated dial indicated generally at 17 for readily determining geographical locations.

The system can readily be calibrated by receiving a signal from a known direction, for example, north. The position of the indicator 16 is then taken as north, and if a compass type dial is used on the indicator, the equipment when tuned to a signal the direction of arrival of which is unknown, will position the indicator 16 and show the direction of arrival of the incoming wave. The windings $W_1$, $W_2$ and $W_3$ of the indicator are so electrically oriented that they produce magnetic fields 120° apart, so that the indication of the permanent magnet rotor 15 is in accord with the direction of any incoming signal which may be received.

As heretofore explained, the system in its preferred arrangement employs three substantially identical receivers and a heterodyne oscillator arranged for single dial control. The frequency of the heterodyne oscillator should preferably be kept within 50 to 150 cycles of the received signal frequency. This is readily accomplished by means of an acceptable automatic frequency control system. It is further desirable that the radio frequency output of the heterodyne oscillator and hence the injector antenna power input be readily controllable.

Fig. 2 shows one arrangement of an automatic output control for the heterodyne oscillator 5 which connects to the injector antenna 4. A portion of the output power of one of the receivers 1', 2' or 3' is rectified and suitably filtered for use as a direct current control voltage. If the audio frequency output of the receiver is too low, the magnitude of the current in the injector antenna 4 must be reduced. This lack of D. C. control voltage therefore is utilized to increase the bias voltage on the electron tube amplifiers $V_7$ and $V_8$. The increased bias on these tubes will reduce the input to the injector antenna 4, allow the automatic volume controls of the receivers to operate and increase the gain of the receivers and thus raise the audio frequency output of the receivers.

If on the other hand the audio frequency voltage is too high, the direct current control voltage will also be high. This will reduce the bias on vacuum tubes $V_7$ and $V_8$ resulting in an increase in injector antenna input. This increase in injector antenna input will operate the automatic volume controls of the receivers 1', 2' and 3', so as to reduce their gain and hence reduce the magnitude of the audio frequency output voltage. Preferably the relative magnitude of the injector voltage and the received signal voltage in any receiving channel should be of the order of 10:1. When the ratio is of this magnitude or greater, the audio frequency output of each of the receivers will be substantially sinusoidal. I have shown the output of receiver 1' from terminals 1''—0 leading to primary winding 7 of the delta connected transformer, but, with leads 18 extending therefrom to transformer 19, the output of which connects to the full wave rectifier circuit shown at 20 for developing a control voltage across resistor 21. The resistor 21 connects through resistances 22 and 23 with the control grids of amplifiers $V_7$ and $V_8$, respectively, for controlling the operation of the tubes as amplifiers and the magnitude of the current impressed upon the injector antenna 4. I have shown amplifiers $V_7$ and $V_8$ connected in conventional manner through tuned circuits 24 and 25 to the injector antenna 4.

While I have described my invention in certain of its preferred embodiments, I desire that it be understood that modifications may be made and that no limitations upon my invention are intended other than may be imposed by the scope of the appended claims.

What I claim as new and desire to secure by Letters Patent of the United States is as follows:

1. A direction finding system comprising a plurality of stationary geographically spaced receiving antennae, an injector antenna centrally disposed with respect to said receiving antennae, means for electrically exciting said injector antenna for impressing heterodyning energy upon said plurality of geographically spaced receiving antennae, independent receiving circuits connected with said plurality of geographically spaced receiving antennae, a polyphase circuit interconnected with the outputs of said independent receiving circuits, an angularly shiftable indicator, and means for magnetically controlling said indicator connected with said polyphase circuit whereby said indicator may be moved to a position corresponding to the position of a radio transmitting source with respect to said stationary geographically spaced receiving antennae.

2. A direction finding system comprising a plurality of stationary geographically spaced receiving antennae, an injector antenna centrally disposed with respect to said receiving antennae, means for electrically exciting said injector antenna, independent receiving circuits connected with said spaced receiving antennae, a multiphase circuit interconnected with the outputs of said receiving circuits, an angularly shiftable indicator having magnetic control means therefor, and circuits coupling said magnetic control means with said multiphase circuit whereby said angularly shiftable indicator is moved to a position indicating the position of a radio signalling source with respect to said plurality of stationary geographically spaced receiving antennae.

3. A direction finding system comprising a plurality of fixed geographically spaced receiving antennae, an injector antenna centrally disposed with respect to said receiving antennae, means for electrically exciting said injector antenna, separate receiving circuits individual to said receiving antennae, a polyphase circuit having the respective terminals thereof connected with the individual receiving circuits, an electrical indicator, means for magnetically actuating said electrical indicator, and circuits coupling the last said means with the respective phases of said polyphase circuit, the means for magnetically actuating said indicator being disposed in symmetrically spaced relation in a manner proportional to the fixed geographical separation of said receiving antennae.

4. A direction finding system comprising a plurality of fixed geographically spaced receiving antennae, an injector antenna centrally disposed with respect to said receiving antennae, means for electrically exciting said injector antenna, separate receiving circuits individual to said receiving antennae, a polyphase circuit having the respective terminals thereof connected with the individual receiving circuits, an electrical indicator, means for magnetically actuating said electrical indicator, said last mentioned means being disposed in spaced relation about said electrical indicator in positions proportional to the relative positions of said fixed geographically spaced receiving antennae, circuits coupling said last mentioned means with the respective phases of said polyphase circuit, and means for independently controlling the phase of the currents in each of said last mentioned circuits.

5. A direction finding system comprising a plurality of stationary geographically spaced receiving antennae, an injector antenna centrally disposed with respect to said receiving antennae, means for electrically exciting said injector antenna, separate receiving circuits individual to said receiving antennae, a polyphase circuit having the respective terminals thereof connected with the individual receiving circuits, an electrical indicator, magnetic means disposed in spaced positions about said electrical indicator for controlling said indicator in accordance with the energy received by the respective receiving antennae, circuits coupling the last said means with the respective phases of said polyphase circuit, and means interconnecting the output of one of said receiving circuits with the means for electrically exciting said injector antenna for controlling the energy impressed by said injector antenna upon each of said geographically spaced receiving antennae.

6. A direction finding system comprising a plurality of stationary geographically spaced receiving antennae, an injector antenna centrally disposed with respect to said receiving antennae, means for electrically exciting said injector antenna, separate receiving circuits individual to said receiving antennae, a polyphase circuit having the respective terminals thereof connected with the individual receiving circuits, an electrical indicator, means for magnetically actuating said electrical indicator, circuits coupling the last said means with the respective phases of said polyphase circuit, and rectifier means disposed in each of said coupling circuits for impressing rectified energy upon the means for magnetically actuating said electrical indicator.

7. A direction finding system comprising a plurality of stationary geographically spaced receiving antennae, an injector antenna centrally disposed with respect to said receiving antennae, means for electrically exciting said injector antenna, separate receiving circuits individual to said receiving antennae, a polyphase circuit having the respective terminals thereof connected with the individual receiving circuits, an electrical indicator, means for magnetically actuating the last said electrical indicator, circuits coupling said means with the respective phases of said polyphase circuit, a full wave rectifier circuit disposed in each of said coupling circuits for impressing rectified energy of both half waves in opposite relation upon the means for magnetically actuating said electrical indicator, and means connected between the respective phases of said polyphase circuit and each of said rectifier circuits for counteracting the rectified current of one half wave in each of said coupling circuits.

8. A direction finding system comprising a plurality of stationary geographically spaced receiving antennae, an injector antenna centrally disposed with respect to said receiving antennae, means for electrically exciting said injector antenna, separate receiving circuits individual to said receiving antennae, a polyphase circuit having the respective terminals thereof connected with the individual receiving circuits, an electrical indicator, and magnetic means corresponding in number to the number of said geographically spaced receiving antennae, one of said magnetic means being individual to each of the phases of said polyphase circuit, whereby the effects of each of said magnetic means may be integrated with respect to said electrical indicator for shifting said electrical indicator to a position which corresponds to the position of a radio signalling source with respect to the plurality of geographically spaced receiving antennae.

9. A direction finding system comprising a plurality of geographically spaced receiving antennae, an injector antenna centrally disposed with respect to said receiving antennae, means for electrically exciting said injector antenna, separate receiving circuits individual to said receiving antennae, a polyphase circuit having the respective terminals thereof connected with the individual receiving circuits, an electrical indicator, means individual to each of the phases of the polyphase circuit for electrically controlling the movement of said electrical indicator, and means electrically connected with the output of one of said receiving circuits and with said means for electrically exciting said injector antenna for controlling the amplitude of the energy impressed by said injector antenna upon the plurality of geographically spaced receiving antennae.

10. A direction finding system comprising a plurality of geographically spaced receiving antennae, an injector antenna centrally disposed with respect to said receiving antennae, means for electrically exciting said injector antenna, separate receiving circuits individual to said receiving antennae, a polyphase circuit having the respective terminals thereof connected with the individual receiving circuits, an electrical indicator, means individual to each of the phases of the polyphase circuit for electrically controlling the movement of said electrical indicator, and means including a rectifier circuit electrically connected with the output of one of said receiving circuits and with said means for electrically exciting said injector antenna for controlling the amplitude of the energy impressed by said injector antenna upon the plurality of geographically spaced receiving antennae.

11. A direction finding system comprising a plurality of geographically spaced receiving antennae, an injector antenna centrally disposed with respect to said receiving antennae, means for electrically exciting said injector antenna, separate receiving circuits individual to said receiving antennae, a polyphase circuit having the respective terminals thereof connected with the individual receiving circuits, an electrical indicator, means individual to each of the phases of the polyphase circuit for electrically controlling the movement of said electrical indicator, and means including a full wave rectifier circuit electrically connected with the output of one of said receiving circuits and with said means for electrically exciting said injector antenna for controlling the amplitude of the energy impressed by said injector antenna upon the plurality of geographically spaced receiving antennae.

12. A direction finding system comprising a trio of geographically spaced receiving antennae arranged at the apexes of an equilateral triangle, an injector antenna centrally disposed with respect to said receiving antennae, means for electrically exciting said injector antenna, a receiving circuit individual to each of said receiving antennae, a three-phase delta-connected circuit having the respective terminals thereof connected with the individual receiving circuits, an electrical indicator, a plurality of magnetic devices associated with said electrical indicator spaced substantially 120° about said electrical indicator, and separate circuits interconnecting the said magnetic devices with the respective phases of said polyphase circuit whereby said magnetic devices conjointly control the angular movement of said electrical indicator in response to signalling energy incident upon said plurality of receiving antennae from a signalling source for indicating the position of the signalling source with respect to said receiving antennae.

13. A direction finding system as set forth in claim 3 and including independent circuits connected in balanced relation between the phases of said polyphase circuit and said coupling circuits for producing equal and opposite currents in each of said coupling circuits in predetermined relation to the operating characteristics of said indicator, for establishing a phase reference in each of said coupling circuits for the currents impressed on said indicator actuating means, said impressed currents having a direction through said actuating means determined by whichever of the opposed currents is in phase therewith.

14. A direction finding system as set forth in claim 4, with said means for independently controlling the phase of the currents in each of the coupling circuits including midtap connections in the respective phases of said polyphase circuits and in the coupling circuits related thereto, and independent circuits including phase shifting means connected between corresponding mid-tap connections for producing equal and opposite currents in each of said coupling circuits in phase and in phase opposition with respect to the currents impressed on said indicator actuating means and in predetermined relation to the operating characteristics of said indicator, for establishing a phase reference in each of said coupling circuits for the currents impressed on said indicator actuating means, said impressed currents having a direction through said actuating means determined by whichever of the opposed currents is in phase therewith.

15. A direction finding system comprising a plurality of equally spaced receiving antennae, an injector antenna centrally disposed with respect to said receiving antennae, means for electrically exciting said injector antenna with heterodyning energy, separate receiving circuits individually connected to said receiving antennae, a corresponding number of rectifier means, means for interconnecting said rectifier means and said receiving circuits with each said rectifier means energized in balanced and unbalanced relation by the vector sum and the vector difference of the heterodyne output voltages of two receiving circuits connected with adjacent antennae, phase shifting means for reconciling the phases of the vector sum and difference voltages for operation with respect to the rectifier means, and an electromagnetic indicator having field windings spaced in accordance with the spacing of said receiving antennae and individually energized from said rectifier means.

16. A direction finding system as set forth in claim 15 wherein the vector sum voltages are shifted in phase by 90° and applied to the rectifier means in balanced relation and the vector difference voltages are applied to said rectifier means in unbalanced relation, the vector difference voltage undergoing phase reversal and the direct output voltage of the rectifier means being reversed in polarity with reversal of the relative phase of the component heterodyne voltages in any instance, whereby 180° ambiguity in the indication is avoided.

WALTER H. WIRKLER.